United States Patent Office 2,985,291
Patented May 23, 1961

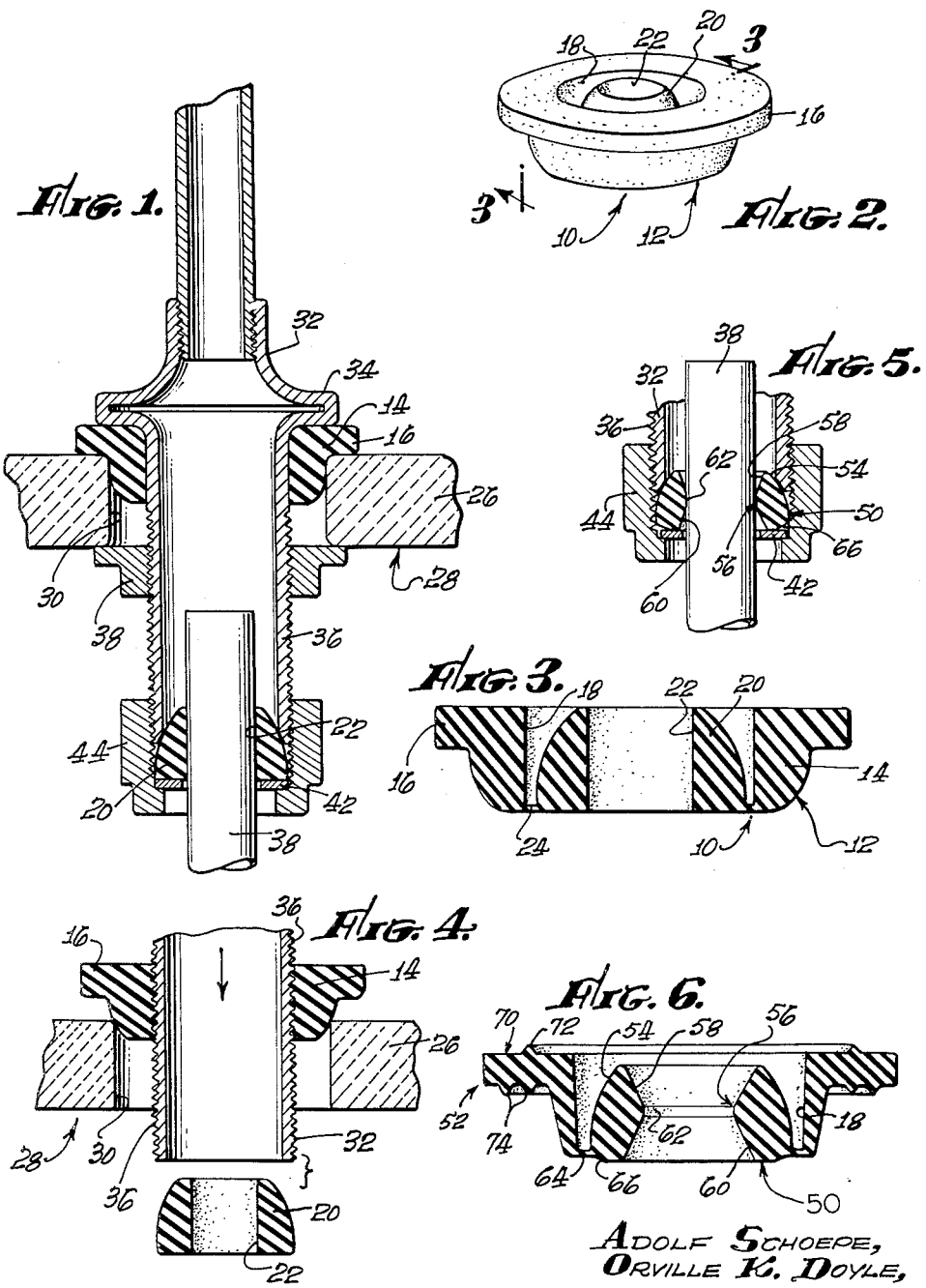

2,985,291

COMPOSITE SEAL CONSTRUCTION

Adolf Schoepe, 1620 N. Raymond Ave., and Orville K. Doyle, 401 E. Las Palmas Drive, both of Fullerton, Calif.

Filed Apr. 28, 1958, Ser. No. 731,169

2 Claims. (Cl. 206—56)

This invention relates to a composite seal construction wherein a plurality of sealing members is incorporated in a unitary body, said sealing members being adapted for ultimate use in the same environment and being readily separable from each other by the severance of a connecting web therebetween.

While the composite seal of the invention will be described as utilized in conjunction with various fittings constituting a portion of the water inlet system of a flush tank, it is, of course, not intended that the concepts thereof be limited thereto since, as will be evident from the disclosure appearing hereinbelow, the composite seal of the invention can be manufactured and utilized for a wide variety of different applications entailing the utilization of a plurality of seals of different configuration in the same structure.

It is well known to those skilled in the plumbing art that the plumbing of the conventional flush tank associated with the conventional toilet involves the utilization of a plurality of seals formed from rubber or other deformable material. Conventionally, such seals are molded as individual pieces and are subsequently subjected to trimming or other operations to remove the flash therefrom. They are thus supplied to the craftsman separately for installation with the associated metallic fittings customarily installed in the water inlet opening of such flush tanks. Obviously, the individual seals must be molded separately and constitute a manufacturing, inventory, and packaging problem since separate supplies of the same must be maintained at the warehouse of the plumbing contractor utilizing the same.

It is, therefore, an object of the invention to provide a composite seal including a body formed from deformable material such as rubber and constituting a plurality of sealing members which are maintained in said body by being internested within one another and by being connected by a thin, readily frangible web portion which will permit them to be easily separated when the time arises for their application at the ultimate point of use.

Thus, a plurality of seals can be molded at the same time in a unitary body form with consequent saving in molding dies and molding operations. Furthermore, the plurality of seals is shipped and inventoried as a unit and readily separated by the fracturing or severance of the web when the need for application thereof arises on the job site.

Another object of the invention is the provision of a composite seal of the aforementioned character adapted particularly for use with the water inlet fittings of a toilet flush tank and which includes a body constituted by an annularly shaped flange seal having a central recess in which is internested a tubing seal adapted for use in conjunction with said flange seal. The lower extremity of the tubing seal and the flange seal are operatively connected to each other by a thin, easily frangible web of rubber or other resilient material and thus they can be readily separated from each other for application at the point of use.

It is also well known to those skilled in the art that the water inlet pipes customarily associated with toilet flush tanks may be of substantially different diameters and since the tubing seal incorporated in the composite seal of the invention must be adapted to seal the perimeter of such inlet pipes or tubings, it has been necessary in the past to provide tubing seals having bores corresponding to the different diameters of the inlet pipes or tubings.

A further object of the invention is the provision of a tubing seal which is adapted to be utilized in conjunction with inlet tubings of different diameters, thus eliminating the necessity for the provision of tubing seals having bores of different diameters to accommodate the different diameters of the water inlet tubings. Of course, it is an associated object of the invention to incorporate such multi-use tubing seals in a composite seal of the character of that described hereinabove.

Since the necessity for the provision of tubing seals having bores of different diameters is eliminated by the multi-use tubing seal of the invention, only one size of composite seal need be molded for application in a wide variety of different use situations and the consequent economies in manufacture and inventory can readily be appreciated.

It is a general object of the invention to provide a composite seal structure which will facilitate the installation of the plurality of seals incorporated therein at the point of use and which will achieve manufacturing and other economies which can be reflected in the price of the composite seal structure to the ultimate consumer.

Other objects and advantages of the invention will be apparent from the following specification and the accompanying drawing which is for the purpose of illustration only and in which:

Fig. 1 is a vertical, sectional view showing the manner in which the plurality of seals incorporated in the composite seal of the invention are applied at the point of use;

Fig. 2 is a perspective view showing a typical form of composite seal manufactured in accordance with the teachings of the invention;

Fig. 3 is a vertical, sectional view taken on the broken line 3—3 of Fig. 2;

Fig. 4 is an illustration exemplifying the manner in which the frangible web between the plurality of seals incorporated in the composite seal of the invention may be readily severed;

Fig. 5 is a vertical, sectional view showing the application of a modified form of tubing seal constituting a part of the invention; and Fig. 6 is an enlarged, fragmentary, sectional view showing the configuration of the modified tubing seal of the invention and the manner in which it is incorporated as a constituent part of the composite seal of the invention.

Referring to the drawing and particularly to Figs. 2 and 3 thereof, we show a composite seal construction 10 which is molded by conventional means from a deformable material such as rubber, or the like, and which is constituted by a body 12 defining a flange seal 14 of substantially annular configuration having a peripheral flange 16 thereupon and a centrally located recess 18 therein defining the ultimate bore through said flange seal.

Internested with the flange seal 14 and located in the recess 18 is an inlet tubing seal 20 which includes a centrally located bore 22 coaxial with the recess 18 and which, in essence, constitutes a protuberance in the recess 18. The lower extremities of the flange and tubing seals 14 and 20, respectively, are maintained in operative relationship with each other by a thin, easily frangible or severable web 24 which also constitutes the bottom of the recess 18 and which serves to maintain the flange and tubing seals 14 and 20, respectively, in operative relationship as component parts of the composite seal 10 until it becomes desirable to separate the same for use in their ultimate environment.

The ultimate point of use of the flange and tubing seals 14 and 20 is graphically illustrated in Fig. 1 of the drawing wherein there is shown the bottom 26 of a flush tank 28, said bottom having an inlet opening 30 therein in which is located an elongated tubular flanged fitting 32, the flange 34 of which is adapted to be superimposed on the base of the flange seal 14 while the frusto-conical portion of said flange seal is urged into the inlet opening 30, thus preventing leakage of water from the flush tank 28.

The periphery of the fitting 32 is provided with threads 36 and a flange nut 38 is engaged therewith and urged against the underside of the flush tank 28 to compress the flange seal 14 into operative relationship with the flush tank inlet opening 30.

The severance of the flange seal 14 from the tubing seal 20 is accomplished in the manner graphically illustrated in Fig. 4 of the drawing, the lower extremity of the fitting 32 being urged against the bottom of the composite seal construction 10 to sever the web 24 and discharge the tubing seal 20 from internested relationship with the flange seal 14 and into the hand of the craftsman installing the same.

After the severance of the two seals, the tubing seal 20 is disposed about the upper extremity of a water inlet tubing 38, Fig. 1, and a washer 42 and gland nut 44 disposed in operative relationship therewith, the nut 44 being threaded upon the threads 36 until the peripheral wall of the tubing seal 20 engages the lower extremity of the fitting 32 in sealing engagement.

It is, therefore, readily apparent that while the body 12 of the composite seal 10 maintains the flange and tubing seal 14 and 20 in operative relationship with each other, said operative relationship can be readily severed by the fracturing of the web 24 constituting the same, thus achieving the desirable results of economy in manufacture and inventory while still facilitating the ready application of the individual seals at the point of use.

There is shown in Figs. 5 and 6 of the drawing, respectively, a modified tubing seal 50 constituting a part of the invention and adapted to be incorporated in a composite seal construction 52, in the manner graphically illustrated in Fig. 6 of the drawing. The tubing seal 50 has a substantially arcuate outer wall 54 and a bore 56, the wall of which is defined by a frusto-conical portion 58 and an outwardly opening frusto-conical portion 60, the contiguous extremities of said frusto-conical portions 58 and 60 being separated by a flat area 62 which serves, as best shown in Fig. 5 of the drawing, as the initial contact and sealing surface with the periphery of the water inlet tubing 38.

The tubing seal 50 of the invention can be readily molded as a component part of the composite seal structure 52 in operative association with a flange seal 14 of the character previously described and connected thereto by a web 64 of a frangible nature, said web being located intermediate the wall of the recess 18 in the body of the composite seal 52 and being connected at the juncture of the upwardly and angularly inclined bottom 66 of the tubing seal 50 and the peripheral wall 54 thereof.

As previously indicated, the tubing seal 50 is adapted for use in conjunction with inlet tubings 38 of different diameters, the facility of use of the seal 50 being achieved by the fact that the frusto-conical portions 58 and 60 of the bore 56 define the initial sealing area 62 for engagement with the periphery of the smallest diameter tubing 38. However, when tubings of greater diameter than the tubing 38 are inserted in the bore 56, the initial contact area 62 will tend to be displaced to cause sealing engagement of the portions 58 and 60 of the bore 56 with the peripheral walls of the tubings, thereby permitting accommodation of different diameters of tubing.

Thus, while the tubing seal 50 provides an adequate sealing surface 62 for engagement with the contiguous peripheral wall of a relatively small diameter tubing 38 as progressively larger tubings are inserted into the bore 56 thereof, the bore 56 will accommodate the same by permitting sealing engagement of the wall of the bore 56 with the peripheral walls of the larger sized tubing.

It will be noted that the flange seal 70 associated with the tubing seal 50 incorporates an annular sealing rib 72 in what is ultimately destined to be the upper surface thereof to engage the flange 34 on the fitting 32. In addition, concentric annular rings 74 are provided on the opposite surface of the flange seal for engagement with the contiguous areas of the bottom of the flush tank 28. It is thus readily apparent that optimum sealing may be achieved by the use of the tubing seal 50 in conjunction with the flange seal 70.

There is thus provided by the invention a composite seal construction which achieves manufacturing and inventory economies and facilitates the installation of the plurality of seals constituting the same at the point of use. Also of importance is the provision of a seal for tubings so constructed that it is capable of accommodating tubings of different diameters with equal facility. As previously indicated, while the invention has been disclosed as utilized in the plumbing arts, it is not intended that the teachings thereof be limited to the specific forms of seal shown.

While the composite seal constructions constituting embodiments of the invention have been shown as incorporating circular sealing elements, it is conceivable that elements of square configuration could be utilized in the composite seal construction of the invention and it is not intended that the seal construction be limited to the specific circular configurations shown and described herein.

We claim:

1. A composite seal construction including a body formed from rubber, said body having an outer portion with a radial flange upon the upper extremity thereof and a centrally located recess therein and a protuberance located in said recess and of substantially the same height as said recess is deep, said protuberance having an axial bore, said outer portion and said protuberance being connected to each other by a readily frangible, integral, rubber web portion between the lower extremities thereof and severable by an instrumentality engaging said protuberance to fracture said web.

2. A composite seal construction including a body formed from rubber, said body having an outer portion with a radial flange upon the upper extremity thereof and a centrally located, cylindrical recess therein and a protuberance located in said recess having a curvilinear outer wall and being of substantially the same height as said recess is deep, said protuberance having an axial bore concentric with said recess, said outer portion and said protuberance being connected to each other by a readily frangible, integral, rubber web portion between the lower extremities thereof and severable by an instrumentality engaging said protuberance to fracture said web.

References Cited in the file of this patent

UNITED STATES PATENTS

| | | |
|---|---|---|
| 1,215,249 | Burns | Feb. 6, 1917 |
| 2,148,079 | Martin | Feb. 21, 1939 |
| 2,206,262 | Olt | July 2, 1940 |
| 2,437,640 | Hedrick | Mar. 9, 1948 |
| 2,574,152 | Lewis | Nov. 6, 1951 |
| 2,599,767 | Long | June 10, 1952 |
| 2,661,753 | Stroop | Dec. 8, 1953 |
| 2,721,749 | Crow | Oct. 25, 1955 |
| 2,757,947 | Whitten | Aug. 7, 1956 |
| 2,814,405 | Edwards | Nov. 26, 1957 |

OTHER REFERENCES

Universal Packing & Gasket Co., publication page 7, received in the Patent Office Apr. 14, 1948. (Copy in 288-1.)